United States Patent
Chen (10) Patent No.: US 10,058,119 B1
(45) Date of Patent: Aug. 28, 2018

(54) FRUIT AND VEGETABLE WASHER

(71) Applicant: Chien-Hua Chen, Taoyuan (TW)

(72) Inventor: Chien-Hua Chen, Taoyuan (TW)

( * ) Notice: Subject to any disclaimer, the term of this patent is extended or adjusted under 35 U.S.C. 154(b) by 102 days.

(21) Appl. No.: 15/425,659

(22) Filed: Feb. 6, 2017

(51) Int. Cl.
*A23N 12/02* (2006.01)
*B08B 3/04* (2006.01)

(52) U.S. Cl.
CPC .............. *A23N 12/02* (2013.01); *B08B 3/047* (2013.01)

(58) Field of Classification Search
CPC ..................................................... A23N 12/02
See application file for complete search history.

(56) References Cited

U.S. PATENT DOCUMENTS 3,456,659 A * 7/1969 Tiby ..................... A01K 13/001
  134/148
2009/0266383 A1* 10/2009 Wang ..................... A23N 12/02
  134/25.3
2012/0260957 A1* 10/2012 Lee ......................... A23N 12/02
  134/56 R

* cited by examiner

*Primary Examiner* — Jason Y Ko
(74) *Attorney, Agent, or Firm* — Shimokaji IP (57) ABSTRACT

A fruit and vegetable washer includes a housing, an upper cover, a spin-and-turbulence unit, a power unit, a control assembly, a cleaning basket and a stabilizing shaft. A polygonal accommodating chamber is formed in the housing. The cleaning basket is cylindrical and is mounted rotatably in the accommodating chamber. Because of the polygonal cross section of the accommodating chamber of the housing and the circular cross section of the cleaning basket, the space between the accommodating chamber and the cleaning basket has a circular inner surface and a rectangular outer surface. When water fills up the space and the power unit starts to rotate the cleaning basket, the water will flow between the rectangular outer surface and the circular inner surface and keep pushing the inner surface of the accommodating chamber, producing complex turbulent flows and fully cleaning the fruits and vegetables inside the cleaning basket.

13 Claims, 11 Drawing Sheets

FRUIT AND VEGETABLE WASHER

BACKGROUND OF THE INVENTION

1. Field of the Invention

The present invention relates to a washer and, more particularly, to a fruit and vegetable washer with a housing and a cleaning basket rotatably mounted in the housing. The space between the rotatable cleaning basket and the inner surface of the housing is partially wide and partially narrow, allowing the cleaning basket to effectively stir the water inside the housing and produce a huge amount of turbulence, which can clean the fruit and vegetable from various angles and remove the dirt from the surface of the fruits and vegetables thoroughly.

2. Description of the Prior Arts

A conventional fruit and vegetable washer has a housing and a cylindrical tank inside the housing. Inside the tank is a cylindrical mesh cleaning basket and a drive motor which connects with the cleaning basket. To clean the fruits and vegetables, the users first put the fruits and vegetables into the cleaning basket, close an upper cover of the housing and turn on the switch to start the motor, and the cleaning basket will then rotate in the tank, producing turbulence of water flow to clean the fruits and vegetables in the cleaning basket.

However, since the tank and the cleaning basket are both cylindrical and are equidistant from each other in all radial directions, the turbulence produced by the spinning of the cleaning basket is not apparent. In other words, most of the water flows are circulating within the annular space between the cleaning basket and the inner surface of the tank rather than passing in and out of the cleaning basket. This reduces the cleaning efficiency of the washer.

To overcome the shortcomings, the present invention provides a fruit and vegetable washer to mitigate or obviate the aforementioned problems.

SUMMARY OF THE INVENTION

The main objective of the present invention is to provide a fruit and vegetable washer with a housing and a cleaning basket rotatably mounted in the housing, the space between the cleaning basket and the inner surface of the housing is partially wide and partially narrow, allowing the cleaning basket to effectively stir the water inside the housing and produce a huge amount of turbulence to clean the fruit and vegetable from various angles and remove the dirt from the surface of the fruits and vegetables thoroughly.

To achieve the foregoing objective, the fruit and vegetable washer includes a housing, an upper cover, a spin-and-turbulence unit, a power unit, a cleaning basket and a stabilizing shaft. The housing has an accommodating chamber and an upper opening. The accommodating chamber is formed in the housing and a cross section of the accommodating chamber is polygonal from the top view. The accommodating chamber has multiple corners formed on an inner surface of the accommodating chamber. The upper opening is formed on a top surface of the housing and communicates with the accommodating chamber. The upper cover is mounted on a top surface of the housing and covers the upper opening. The spin-and-turbulence unit is mounted on the top surface of the housing and is mounted between the housing and the upper cover. The spin-and-turbulence unit has a mounting plate and a spin-and-turbulence plate. The mounting plate is mounted between the top surface of the housing and the upper cover. The spin-and-turbulence plat rotatably mounted on a bottom surface of the mounting plate and has multiple first turbulence protrusions formed on a bottom surface of the spin-and-turbulence plate. The power unit is mounted securely on the mounting plate and has a motor and a driving element. The motor is mounted on a top face of the mounting plate. The driving element is rotatably mounted on the bottom surface of the mounting plate and is connected to the motor. The driving element is unrotatably connected to the spin-and-turbulence plate and is capable of being driven by the motor to rotate with the spin-and-turbulence plate synchronously. The cleaning basket is cylindrical and a cross section of the cleaning basket is circular from the top view. The cleaning basket is unrotatably mounted on the bottom surface of the spin-and-turbulence plate and has an accommodating space and multiple turbulence openings. The accommodating space is formed in the cleaning basket. The multiple turbulence openings are formed through a lateral side of the cleaning basket. The stabilizing shaft is rotatably mounted on an inner bottom surface of the accommodating chamber of the housing and is unrotatably mounted securely on a bottom surface of the cleaning basket.

Given the foregoing structure of the fruit and vegetable washer, because of the polygonal cross section of the accommodating chamber of the housing and the circular cross section of the cleaning basket, the space between the accommodating chamber and the cleaning basket has a circular inner surface and a rectangular outer surface. When the water fills up this irregularly-shaped space and then the power unit starts to rotate the cleaning basket, the water will flow between the rectangular outer surface and the circular inner surface and keep pushing the inner surface of the accommodating chamber and producing complex turbulent flows. Furthermore, the first turbulence protrusions of the spin-and-turbulence plate and the turbulence openings of the cleaning basket intensify the turbulent flows to clean the fruits and vegetables in the cleaning basket effectively and take away the dirt from the surface of those fruits and vegetables.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
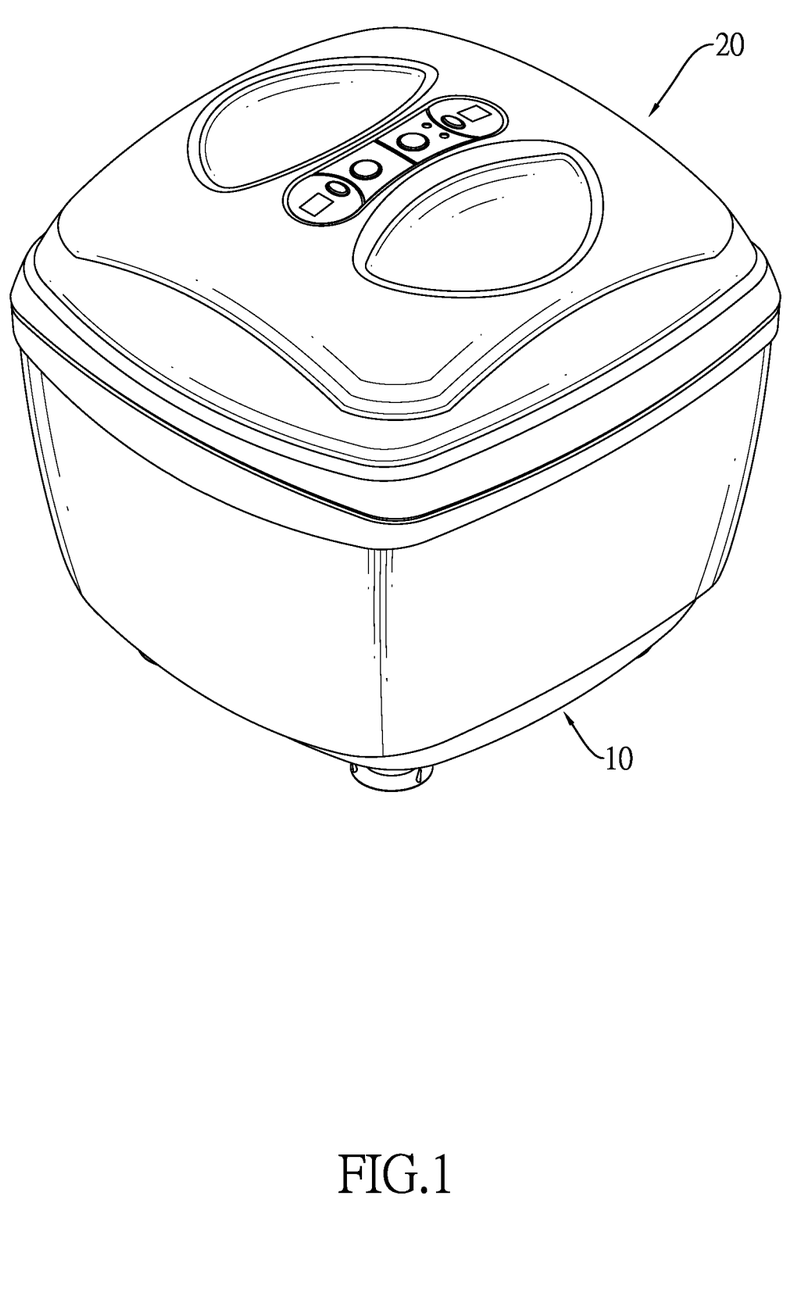
FIG. 1 is a perspective view of a fruit and vegetable washer in accordance with the present invention.
Figure 2:
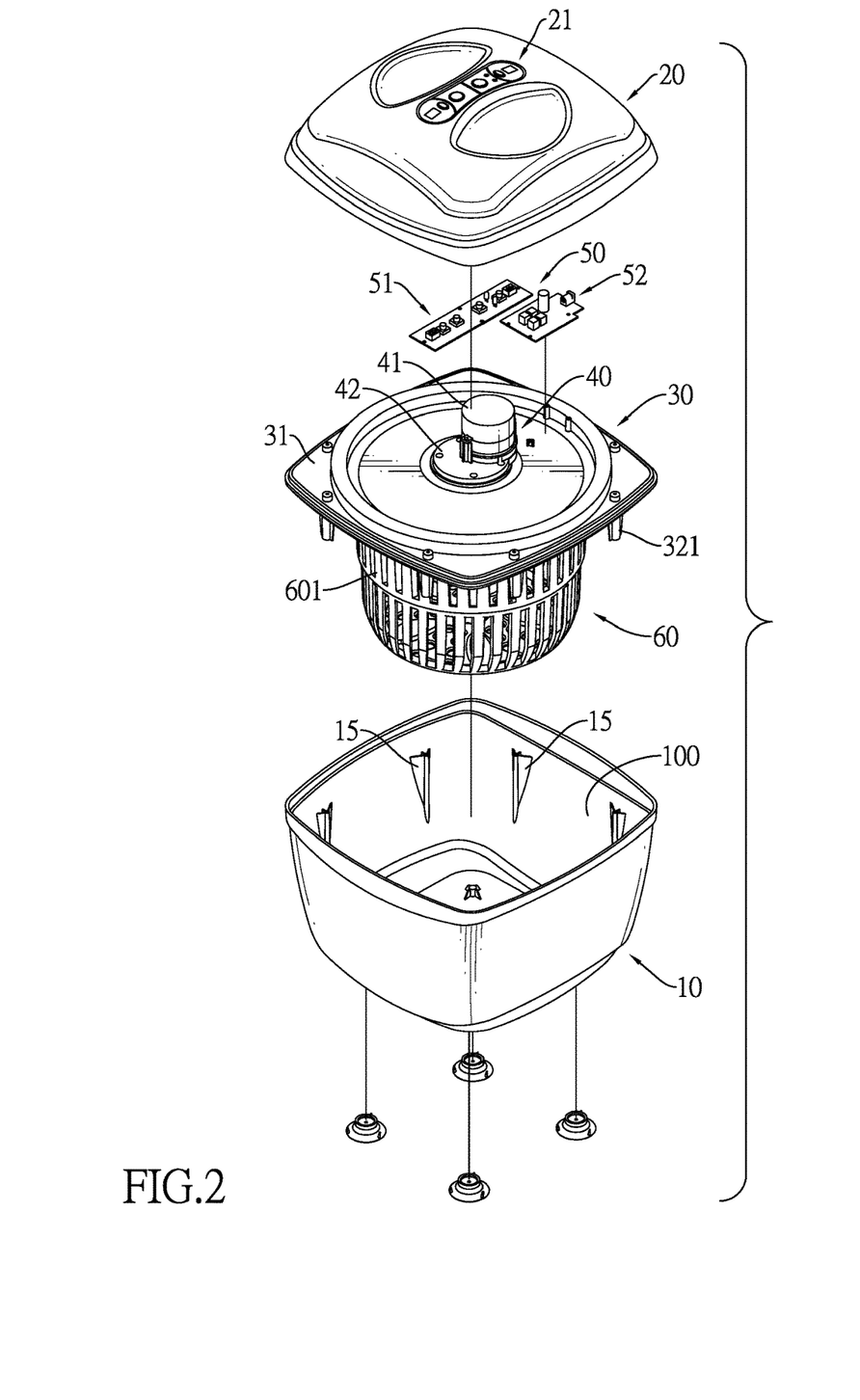
FIG. 2 is an exploded perspective view of the fruit and vegetable washer in FIG. 1.
Figure 3:
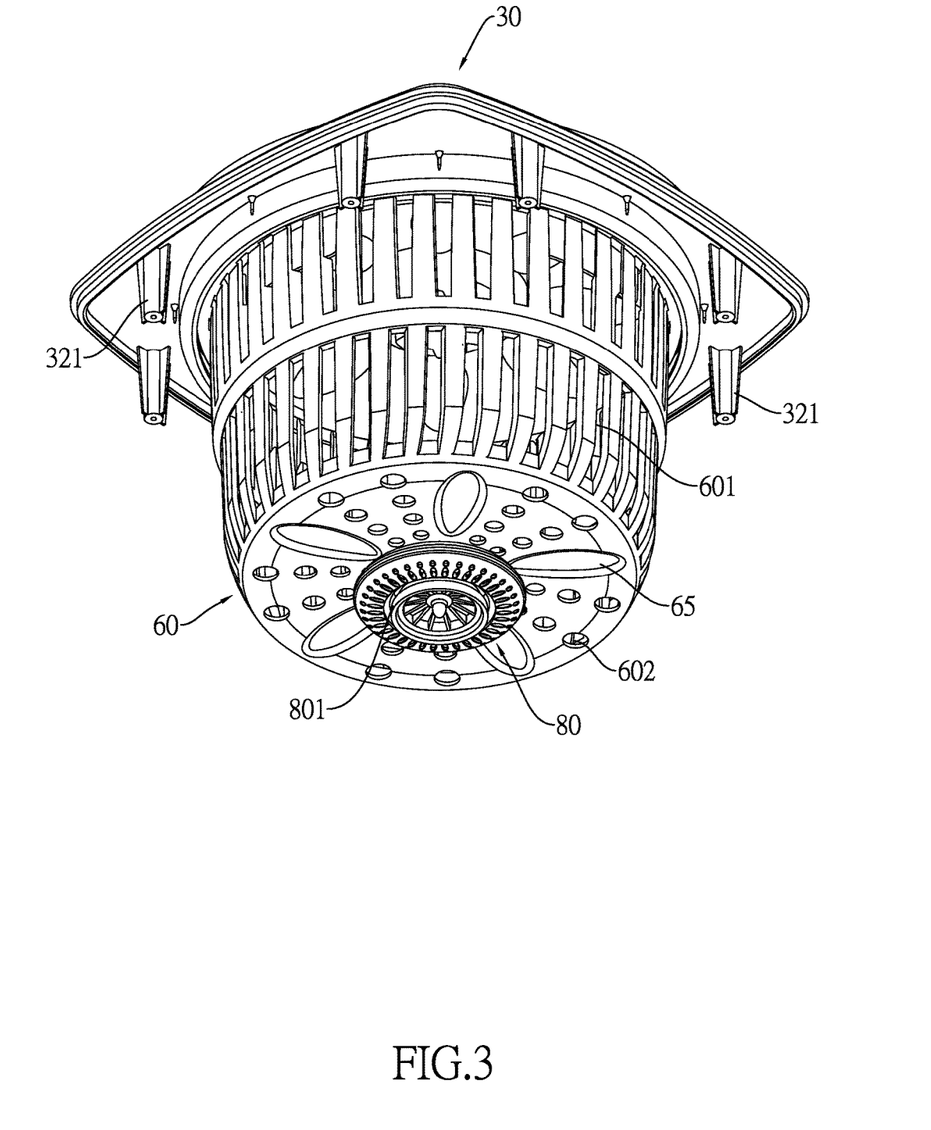
FIG. 3 is a perspective view of the fruit and vegetable washer in FIG. 1, shown without a housing and an upper cover.
Figure 4:
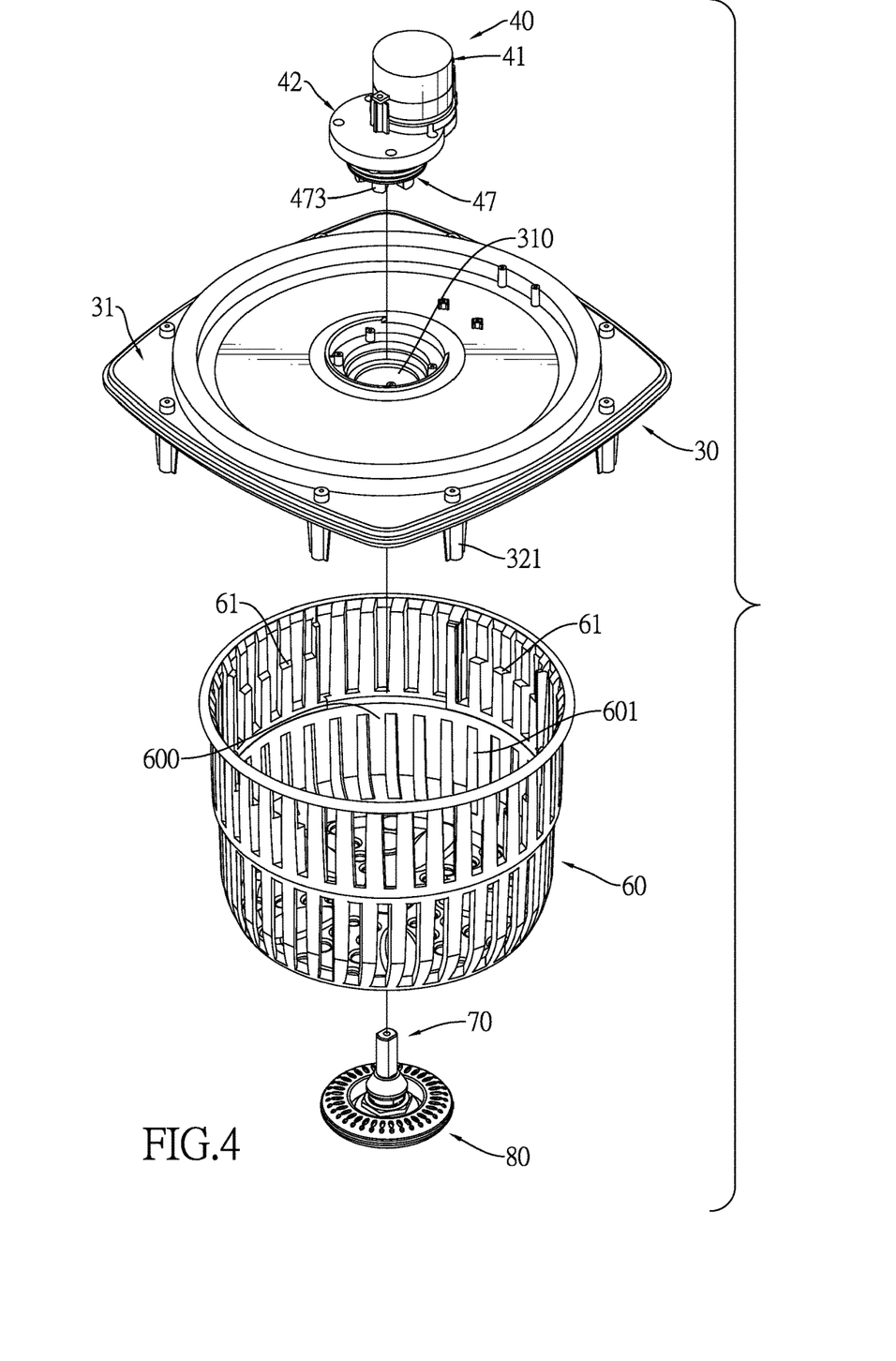
FIG. 4 is a partially exploded perspective view of the fruit and vegetable washer in FIG. 1, shown without the housing and the upper cover.
Figure 5:
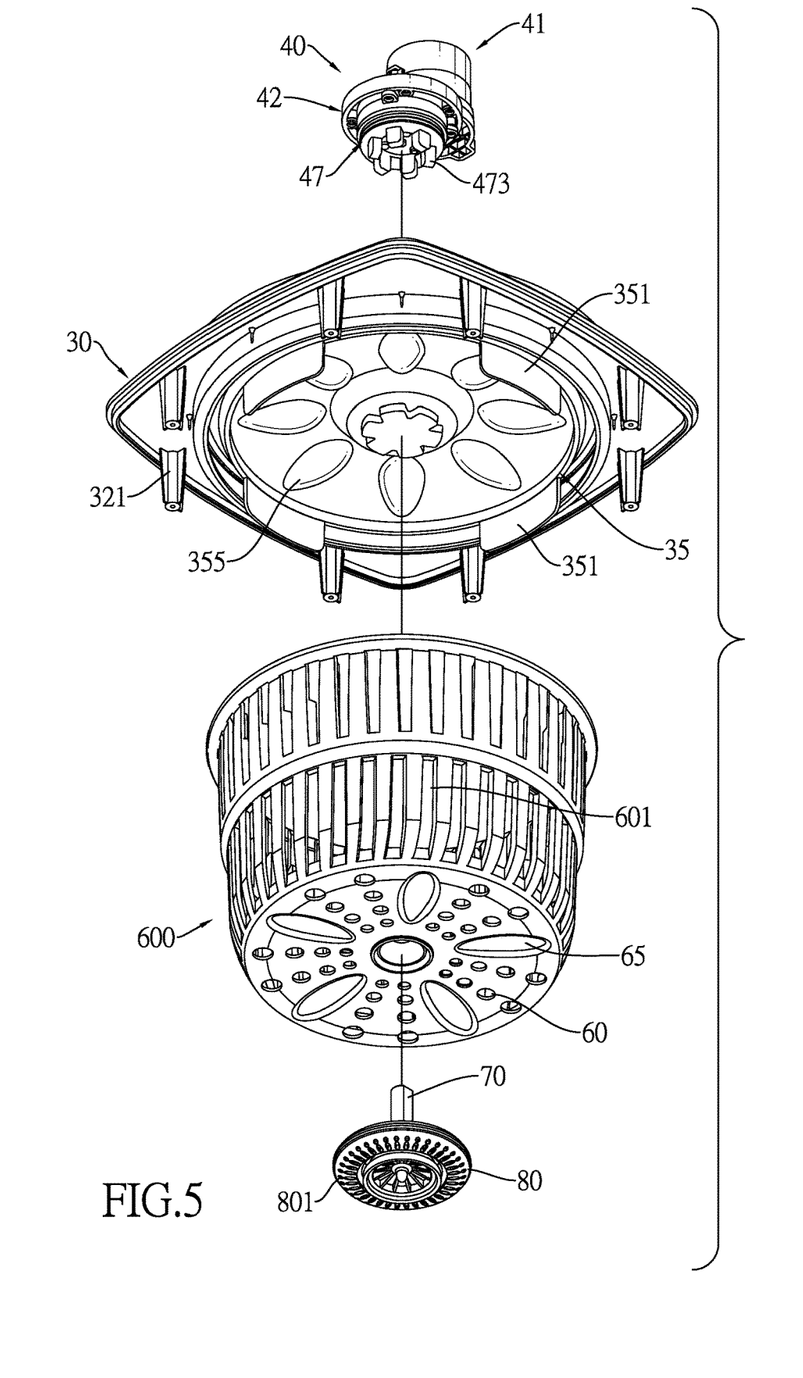
FIG. 5 is another partially exploded perspective view of the fruit and vegetable washer in FIG. 1, shown without the housing and the upper cover.

With reference to FIGS. 1, 2 and 4, a fruit and vegetable washer in accordance with the present invention comprises a housing 10, an upper cover 20, a spin-and-turbulence unit 30, a power unit 40, a control assembly 50, a cleaning basket 60, a stabilizing shaft 70 and an annular impurity cleaner 80.

With reference to FIG. 2, an accommodating chamber 100 is formed on the housing 10 and a cross section of the accommodating chamber 100 is polygonal from the top view. The accommodating chamber 100 has multiple corners formed on an inner surface of the accommodating 100. An upper opening is formed on a top surface of the housing 10 and communicates with the accommodating chamber 100. Multiple turbulence fins 15 radially and inwardly extend from the inner surface of the accommodating chamber 100.

The upper cover 20 is mounted on the top surface of the housing 10 and covers the upper opening. A keypad 21 is mounted on a top surface of the upper cover 20.

Figure 6:
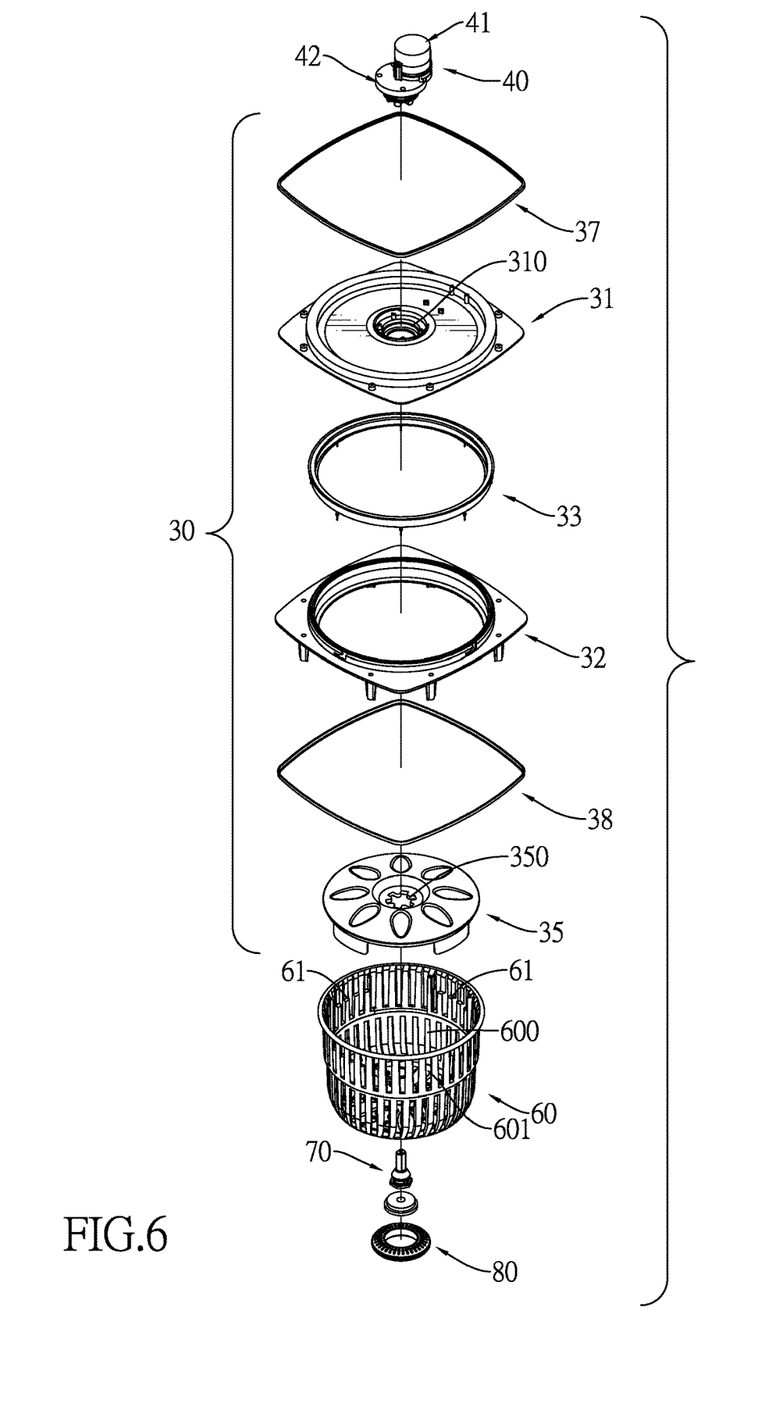
FIG. 6 is an exploded perspective view of the fruit and vegetable washer in FIG. 1, shown without the housing and the upper cover.
Figure 7:
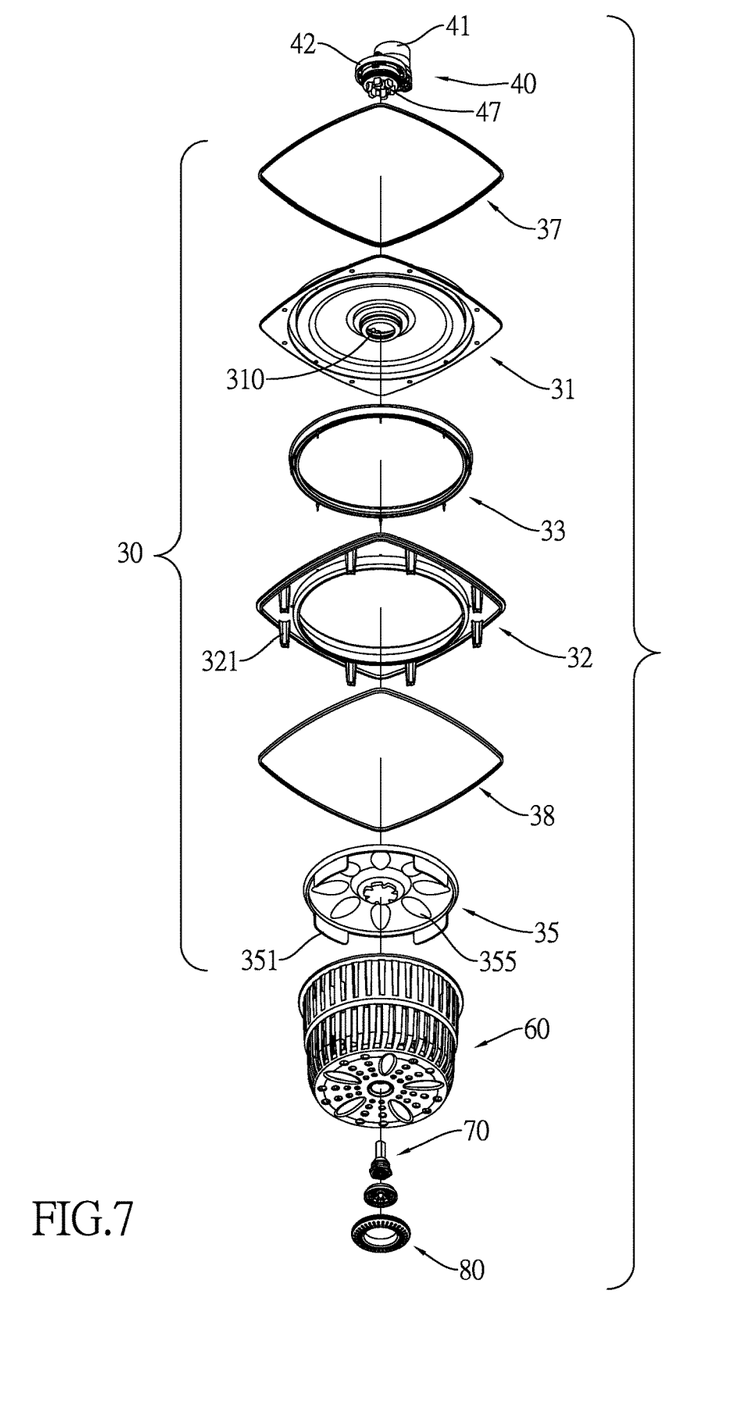
FIG. 7 is another exploded perspective view of the fruit and vegetable washer in FIG. 1, shown without the housing and the upper cover.

With reference to FIGS. 6 and 7, the spin-and-turbulence unit 30 is mounted on the top surface of the housing 10. More precisely, the spin-and-turbulence 30 is mounted between the accommodating chamber 100 of the housing 10 and the upper cover 20. The spin-and-turbulence unit 30 has a mounting plate 31, a spin-and-turbulence plate 35, a supporting ring 32 and a retaining ring 33.

The mounting plate 31 is mounted between the top surface of the housing 10 and the upper cover 20. Two sealing washers 37, 38 are mounted on the mounting plate 31. The sealing washer 37 is mounted on a top surface of the mounting plate 31 and is in airtight contact with the top surface of the housing 10. The sealing washer 38 is mounted on a bottom surface of the mounting plate 31 and is in airtight contact with a bottom surface of the upper cover 20. Furthermore, a mounting groove 310 is formed on the top surface of the mounting plate 31.

The spin-and-turbulence plate 35 is rotatably mounted on the bottom surface of the mounting plate 31 and has multiple first turbulence protrusions 355 formed on a bottom surface of the spin-and-turbulence plate 35. The first turbulence protrusions 355 may be oval-shaped protrusions. Multiple fixing boards 351 are formed on and extend from the bottom surface of the spin-and-turbulence plate 35. Moreover, a connecting recess 350 is formed on a top surface of the spin-and-turbulence plate 35.

The supporting ring 32 is mounted on the bottom surface of the mounting plate 31 and has multiple supporting rods 321 extending downwardly from a bottom surface of the supporting ring 32 and contacting top surfaces of the multiple turbulence fins 15 respectively.

The retaining ring 33 is mounted securely between the mounting plate 31 and the supporting ring 32.

Figure 8:
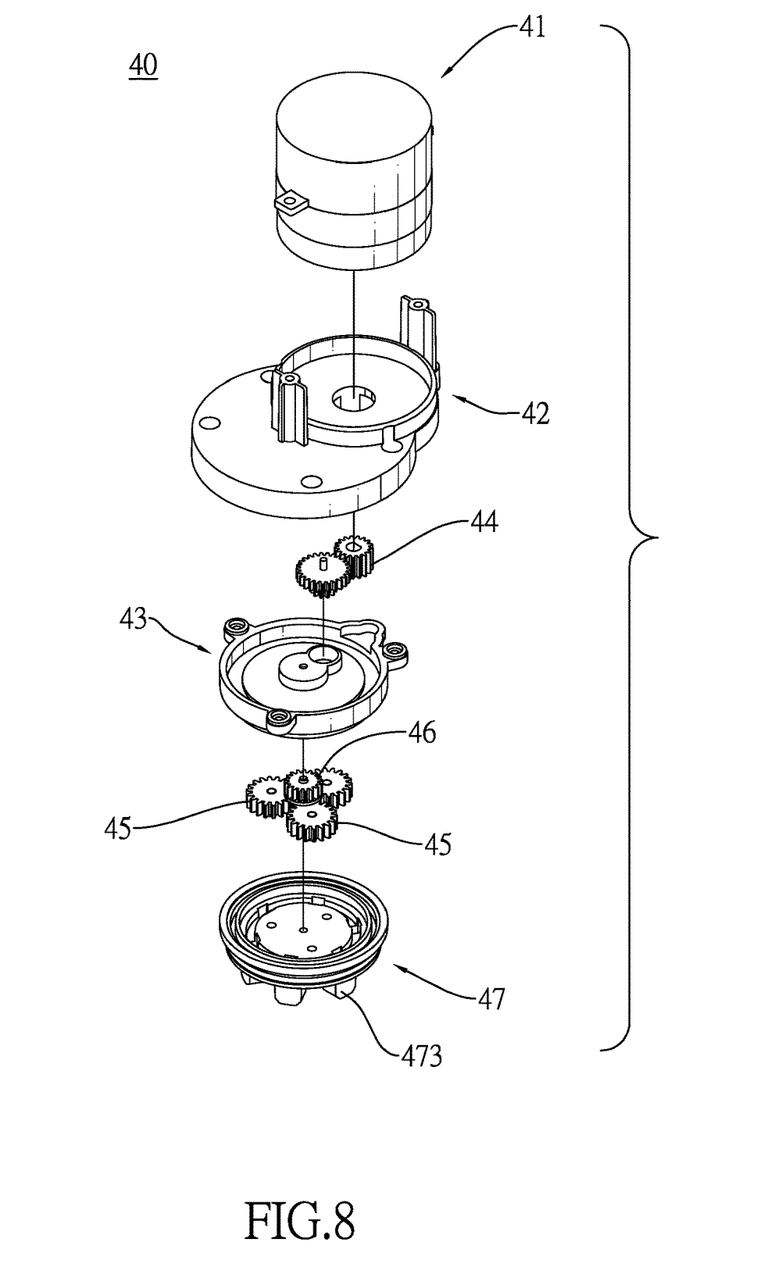
FIG. 8 is an exploded perspective view of the power unit of the fruit and vegetable washer in FIG. 1.
Figure 9:
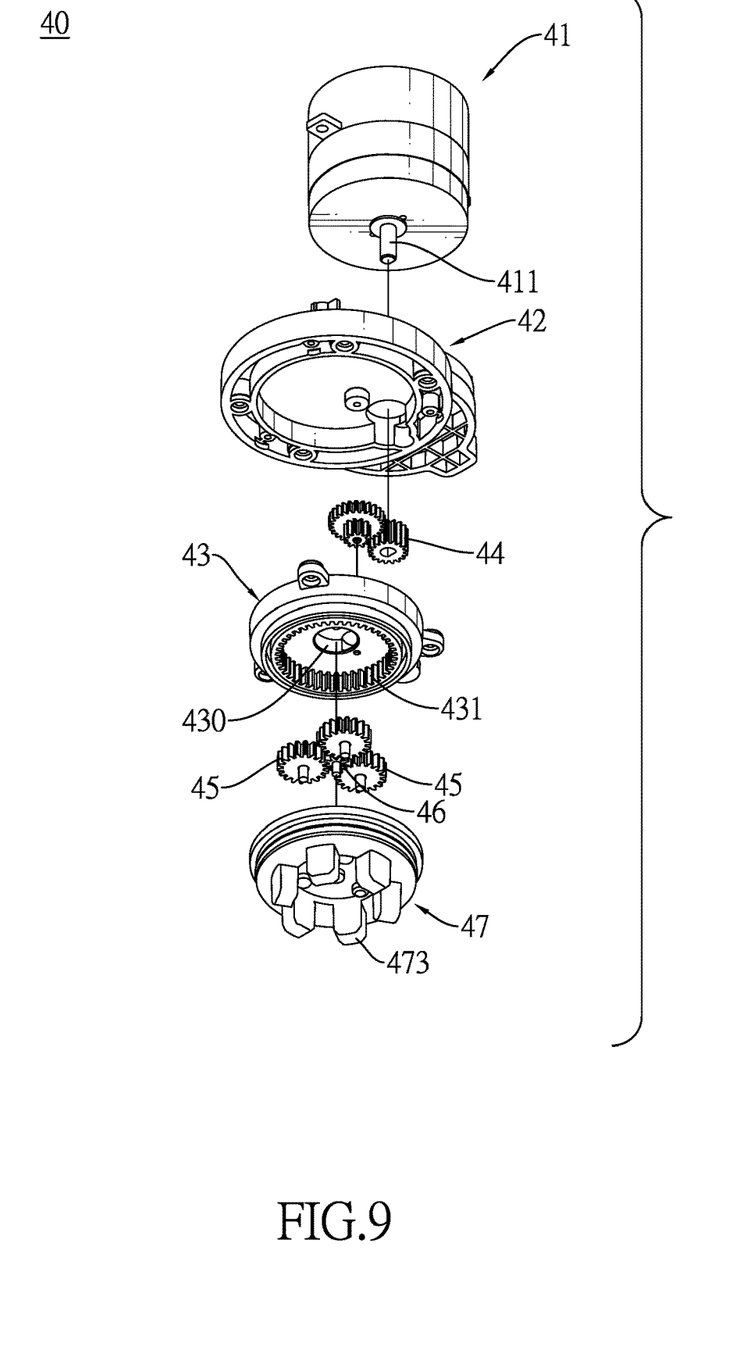
FIG. 9 is another exploded perspective view of the power unit of the fruit and vegetable washer in FIG. 1.

With reference to FIGS. 8 and 9, the power unit 40 is mounted securely on the mounting plate 31 and has a motor 41, a fixing frame 42, a gear holder 43, multiple driving gears 44, a sun gear 46, multiple planetary gears 45 and a driving element 47.

The motor 41 is mounted on the top surface of the mounting plate 31 and has a shaft 411 mounted on the motor 41.

The fixing frame 42 is mounted on the top surface of the mounting plate 31 and covers the mounting groove 310. In addition, the motor 41 is mounted on top of the fixing frame 42.

The gear holder 43 is mounted on a bottom surface of the fixing frame 42 and has an accommodating recess 430 and an annular gear 431. The accommodating recess 430 is formed in the gear holder 43. The annular gear 431 is mounted on a bottom surface of the gear holder 43.

The multiple driving gears 44 are mounted between the fixing frame 42 and the gear holder 43. The multiple driving gears 44 engage with each other, wherein one of the driving gears 44 is mounted securely on the shaft 411 of the motor 41.

The multiple planetary gears 45 are mounted on the bottom surface of the gear holder 43 and engage with both the sun gear 46 and the annular gear 431. The multiple planetary gears 45 can revolve around the sun gear 46.

The driving element 47 is rotatably mounted on the bottom surface of the gear holder 43 and is mounted with the multiple planetary gears 45. When the motor 41 drives the sun gear 46, the planetary gears 45 revolve around the sun gear 46, thereby driving the driving element 47. The driving element 47 is rotatably mounted on the bottom surface of the mounting plate 31 and connects with the motor 41. Meanwhile, the driving element 47 is also unrotatably connected with the spin-and-turbulence plate 35 and can be driven by the motor 41 to rotate with the spin-and-turbulence plate 35 synchronously. A driving protrusion 473 extends from a bottom surface of the driving element 47 and the driving protrusion 473 is unrotatably mounted in the connecting recess 350.

The control assembly 50 is mounted on the bottom surface of the upper cover 20 and is disposed above the mounting plate 31. The control assembly 50 has a key circuit board 51 and a main circuit board 52. The key circuit board 51 connects to the keypad 21. The main circuit board 52 is connected with the motor 41 and the key circuit 51.

Figure 10:
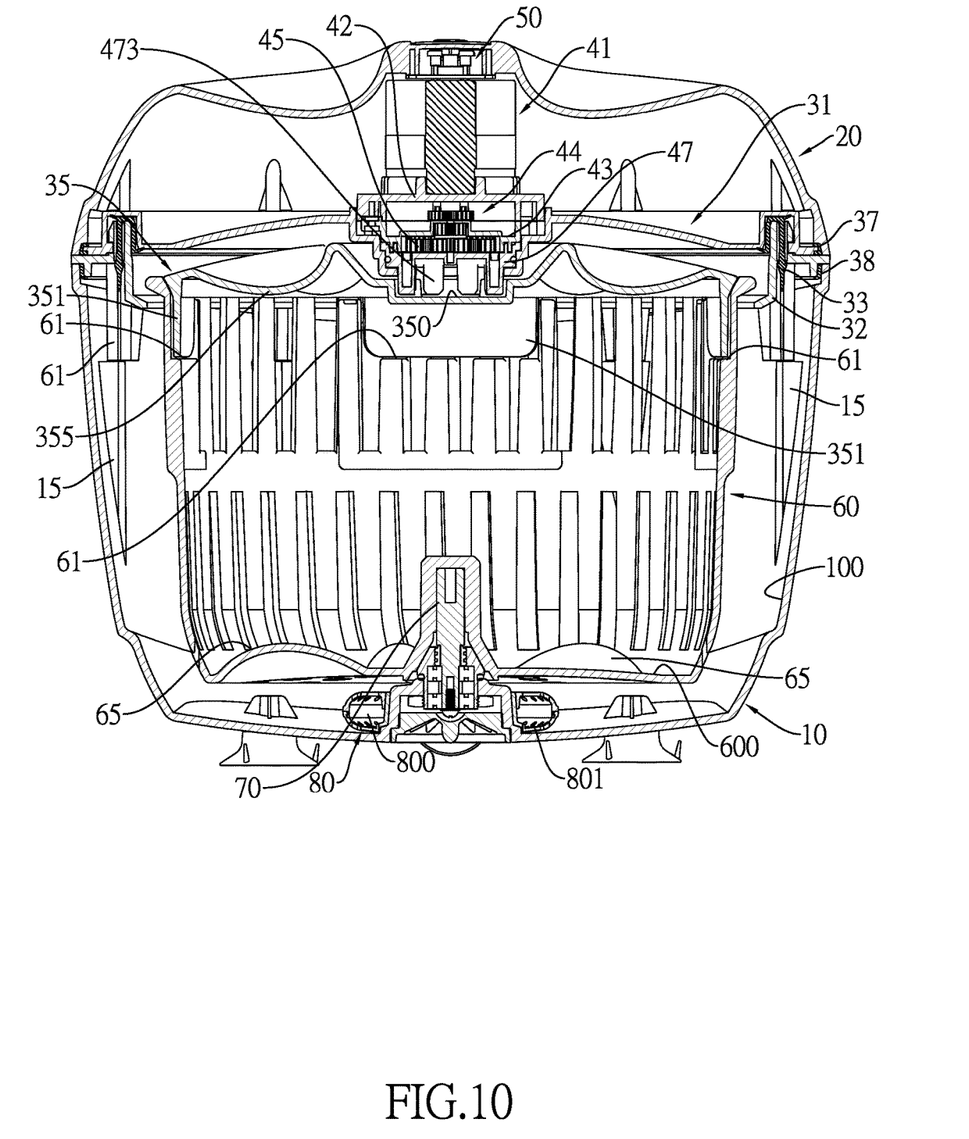
FIG. 10 is a cross sectional side view of the fruit and vegetable washer in FIG. 1.
Figure 11:
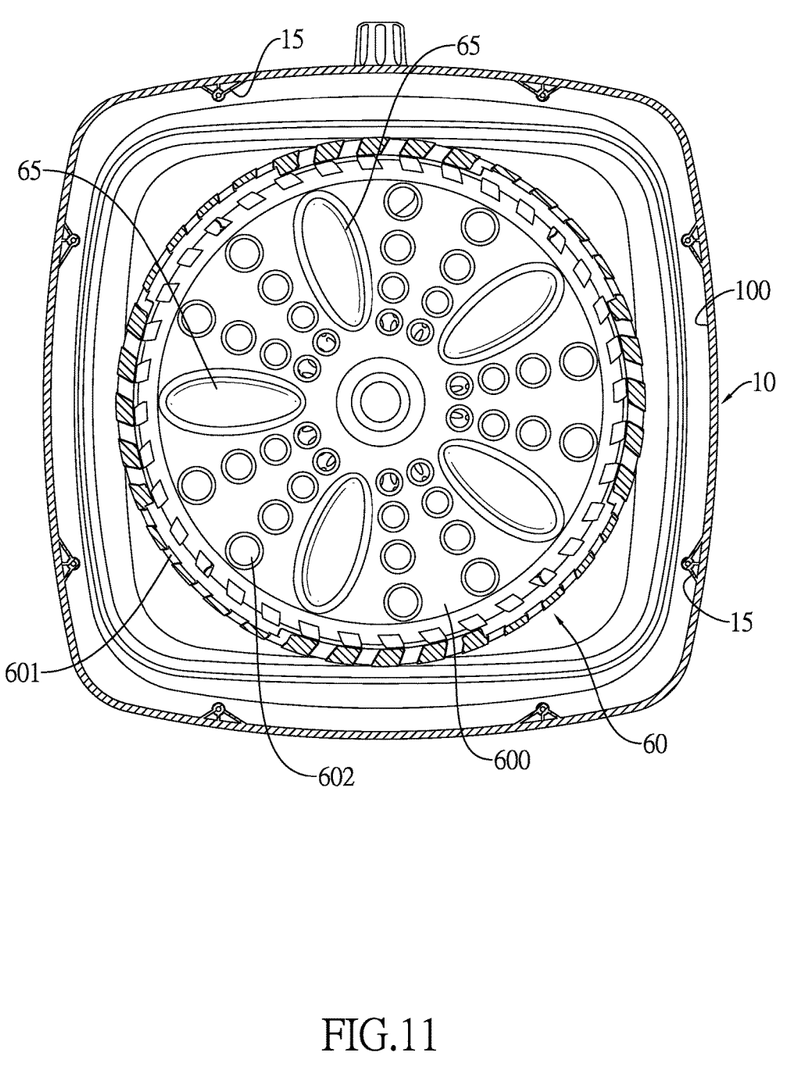
FIG. 11 is a cross sectional top view of the fruit and vegetable washer in FIG. 1.

With reference to FIGS. 10 and 11, the cleaning basket 60 is cylindrical and the cross section of the cleaning basket 60 is circular from the top view. The cleaning basket 60 is unrotatably mounted on the bottom surface of the spin-and-turbulence plate 35. An accommodating space 600 is formed in the cleaning basket 60. Multiple turbulence openings 601 are formed through a lateral side of the cleaning basket 60. Multiple second turbulence protrusions 65 upwardly extend from an inner bottom surface of the accommodating space 600 of the cleaning basket 60. The second turbulence protrusions 65 may be oval-shaped protrusions. Furthermore, multiple fixing recesses 61 are formed near the top of an inner surface of the cleaning basket 60 and are connected with the multiple fixing boards 351 respectively. Multiple perforations 602 are formed through the bottom surface of the cleaning basket 60 and communicate with the accommodating space 600. The perforations 602 increase the amount of water flow that flows into and out of the cleaning basket 60.

The stabilizing shaft 70 is mounted rotatably on an inner bottom surface of the accommodating chamber 100 of the housing 10 and is mounted unrotatably and securely with the bottom surface of the cleaning basket 60.

The annular impurity cleaner 80 is mounted on the bottom surface of the accommodating chamber 100 of the housing 10 and surrounds the stabilizing shift 70. A consumables-containing chamber 800 is formed in the annular impurity cleaner 80 for the storage of the consumables such as activated carbon or sodium-free ion exchange resin. The consumables can percolate the impurities within the water. Multiple holes 801 are formed through the surface of the annular impurity cleaner 80 and communicate with the consumables-containing chamber 800.

Given the foregoing structure of the fruit and vegetable washer, due to the polygonal cross section of the accommodating chamber 100 of the housing 10 and the circular cross section of the cleaning basket 60, the space between the accommodating chamber 100 and the cleaning basket 60 has a circular inner surface and a rectangular outer surface. When water fills up the irregularly-shaped space and the power unit 40 starts to rotate the cleaning basket 60, the water will flow between the rectangular outer surface and the circular inner surface and keep pushing the inner surface of the accommodating chamber 100, producing complex turbulent flows. Furthermore, the first turbulence protrusions 355 of the spin-and-turbulence plate 35 and the turbulence openings 601 of the cleaning basket 60 will intensify the turbulent flows to clean the fruits and vegetables in the cleaning basket 60 effectively and will take away the dirt from the surfaces of the fruits and vegetables.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fruit and vegetable washer comprising:
    a housing having:
        an accommodating chamber formed in the housing and a cross section of the accommodating chamber being polygonal from the top view, the accommodating chamber having:
            multiple corners formed on an inner surface of the accommodating chamber;
        an upper opening formed on a top surface of the housing and communicating with the accommodating chamber;
    an upper cover mounted on the top surface of the housing, and covering the upper opening;
    a spin-and-turbulence unit mounted on the top surface of the housing, mounted between the housing and the upper cover, and having:
        a mounting plate mounted between the top surface of the housing and the upper cover;
        a spin-and-turbulence plate rotatably mounted on a bottom surface of the mounting plate and having multiple first turbulence protrusions formed on a bottom surface of the spin-and-turbulence plate;
    a power unit mounted securely on the mounting plate and having:
        a motor mounted on a top surface of the mounting plate;
        a driving element rotatably mounted on the bottom surface of the mounting plate and connected to the motor, the driving element unrotatably connected to the spin-and-turbulence plate and capable of being driven by the motor to rotate with the spin-and-turbulence plate synchronously;
    a cleaning basket being cylindrical and a cross section of the cleaning basket being circular from the top view, the cleaning basket unrotatably mounted on the bottom surface of the spin-and-turbulence plate and having:
        an accommodating space formed in the cleaning basket;
        multiple turbulence openings formed through a lateral side of the cleaning basket; and
    a stabilizing shaft rotatably mounted on an inner bottom surface of the accommodating chamber of the housing and unrotatably mounted securely on a bottom surface of the cleaning basket.

2. The fruit and vegetable washer as claimed in claim 1, wherein the housing further comprises
    multiple turbulence fins radially and inwardly extending from the inner surface of the accommodating chamber of the housing.

3. The fruit and vegetable washer as claimed in claim 2, wherein the cleaning basket further comprises
    multiple second turbulence protrusions upwardly extending from an inner bottom surface of the accommodating space of the cleaning basket.

4. The fruit and vegetable washer as claimed in claim 3, wherein the first turbulence protrusions and the second turbulence protrusions are both oval-shaped.

5. The fruit and vegetable washer as claimed in claim 4, wherein
    the spin-and-turbulence plate further comprises
        multiple fixing boards formed on and extending from the bottom surface of the spin-and-turbulence plate;
    the cleaning basket further comprises multiple fixing recesses formed near the top of an inner surface of the cleaning basket and connected to the multiple fixing boards, respectively.

6. The fruit and vegetable washer as claimed in claim 5, wherein
    the spin-and-turbulence unit further comprises:
        a supporting ring mounted on the bottom surface of the mounting plate and having
            multiple supporting rods extending downwardly from a bottom surface of the supporting ring and mounted securely on the top surfaces of the multiple turbulence fins respectively; and
        a retaining ring mounted securely between the mounting plate and the supporting ring.

7. The fruit and vegetable washer as claimed in claim 6, wherein the spin-and-turbulence unit further comprises
    two sealing washers, one of the two sealing washers mounted on the top surface of the mounting plate and in airtight contact with the top surface of the housing, and the other one of the two sealing washers mounted on the bottom surface of the mounting plate and in airtight contact with a bottom surface of the upper cover.

8. The fruit and vegetable washer as claimed in claim 7 further comprising
    an annular impurity cleaner mounted on a bottom surface of the accommodating chamber of the housing, surrounding the stabilizing shaft, and having
        a consumables-containing chamber formed in the annular impurity cleaner; and
        multiple holes formed through a surface of the annular impurity cleaner and communicating with the consumables-containing chamber.

9. The fruit and vegetable washer as claimed in claim 8, wherein the cleaning basket further comprises multiple perforations formed through the bottom surface of the cleaning basket and communicating with the accommodating space.

10. The fruit and vegetable washer as claimed in claim 1, wherein
the mounting plate further comprises a mounting groove formed in the top surface of the mounting plate;
the power unit further comprises
a fixing frame mounted on the top surface of the mounting plate and covering the mounting groove;
the motor mounted on a top surface of the fixing frame and having a shaft mounted on the motor;
a gear holder mounted on a bottom surface of the fixing frame and having
an accommodating recess formed in the gear holder;
an annular gear formed on a bottom surface of the gear holder;
multiple driving gears mounted between the fixing frame and the gear holder, the multiple driving gears engaging with each other, and one of the driving gears mounted securely on the shaft of the motor;
a sun gear mounted in the accommodating recess of the gear holder and engaging with one of the multiple driving gears;
multiple planetary gears mounted on the bottom surface of the gear holder and engaging with both the sun gear and the annular gear;
the driving element is rotatably mounted on the bottom surface of the gear holder, is connected securely to the multiple planetary gears, and has a driving protrusion extending from a bottom side of the driving element; when the planetary gears revolve around the sun gear, the planetary gears rotate the driving element; and
the spin-and-turbulence plate has a connecting recess formed on a top surface of the spin-and-turbulence plate, the connecting recess unrotatably mounted with the driving protrusion.

11. The fruit and vegetable washer as claimed in claim 9, wherein
the mounting plate further comprises a mounting groove formed on the top surface of the mounting plate;
the power unit further comprises
a fixing frame mounted on the top surface of the mounting plate and covering the mounting groove;
the motor mounted on atop surface of the fixing frame and having a shaft mounted on the motor;
a gear holder mounted on a bottom surface of the fixing frame and having
an accommodating recess formed in the gear holder;
an annular gear mounted on a bottom surface of the gear holder;
multiple driving gears mounted between the fixing gear and the gear holder, the multiple driving gears engaging with each other, and one of the driving gears mounted securely on the shaft of the motor;
a sun gear mounted in the accommodating recess of the gear holder and engaging with one of the multiple driving gears;
multiple planetary gears mounted on the bottom surface of the gear holder and engaging with both the sun gear and the annular gear;
the driving element further comprises a driving protrusion extending from a bottom side of the driving element; and
the spin-and-turbulence plate further comprises a connecting recess formed on a top surface of the spin-and-turbulence plate, the connecting recess unrotatably mounted with the driving protrusion;
the driving element is rotatably mounted on the bottom surface of the gear holder and mounted with the multiple planetary gears;
when the planetary gears revolve around the sun gear, the driving element rotates with the planetary gear.

12. The fruit and vegetable washer as claimed in claim 10, wherein
a keypad is mounted on the top surface of the upper cover; and
a control assembly is mounted on the bottom surface of the upper cover, is disposed above the mounting plate, and has
a key circuit board connected to the keypad; and
a main circuit board connected to the motor and the key circuit.

13. The fruit and vegetable washer as claimed in claim 11, wherein
a keypad is mounted on the top surface of the upper cover; and
a control assembly is mounted on the bottom surface of the upper cover and on top of the mounting plate and has
a key circuit; and
a main circuit board connected with the motor and the key circuit.

* * * * *